US012665802B2

(12) United States Patent
Wang et al.

(10) Patent No.: US 12,665,802 B2
(45) Date of Patent: Jun. 23, 2026

(54) ELECTRONIC DEVICE AND MODULATION METHOD

(71) Applicant: NTT DOCOMO, INC., Tokyo (JP)

(72) Inventors: Xiaojuan Wang, Beijing (CN); Jianxiong Pan, Beijing (CN); Neng Ye, Beijing (CN); Xiangming Li, Beijing (CN); Wenjia Liu, Beijing (CN); Juan Liu, Beijing (CN); Xiaolin Hou, Beijing (CN); Lan Chen, Beijing (CN); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 3 days.

(21) Appl. No.: 18/568,166

(22) PCT Filed: Jul. 15, 2021

(86) PCT No.: PCT/CN2021/106530
§ 371 (c)(1),
(2) Date: Dec. 7, 2023

(87) PCT Pub. No.: WO2023/283885
PCT Pub. Date: Jan. 19, 2023

(65) Prior Publication Data
US 2024/0340214 A1 Oct. 10, 2024

(51) Int. Cl.
*H04L 27/38* (2006.01)
(52) U.S. Cl.
CPC .................................... *H04L 27/38* (2013.01)

(58) Field of Classification Search
CPC ...................................................... H04L 27/38
See application file for complete search history.

(56) References Cited

U.S. PATENT DOCUMENTS

| | | | | |
|---|---|---|---|---|
| 9,716,601 | B2* | 7/2017 | Rahmati | ............... H04L 1/0054 |
| 9,942,067 | B2* | 4/2018 | Murakami | ........ H04W 28/0263 |
| 2011/0274059 | A1* | 11/2011 | Brown | .................. H04L 5/0064 370/329 |
| 2014/0270012 | A1* | 9/2014 | Sagi | ........................ H04L 27/38 375/340 |
| 2018/0034678 | A1* | 2/2018 | Montorsi | ............ H04L 27/3422 |

FOREIGN PATENT DOCUMENTS

| | | | | |
|---|---|---|---|---|
| CN | 118802423 A | * | 10/2024 | ......... H04B 10/5165 |
| WO | WO-2021105546 A1 | * | 6/2021 | |

* cited by examiner

*Primary Examiner* — Freshteh N Aghdam
(74) *Attorney, Agent, or Firm* — Osha Bergman Watanabe & Burton LLP

(57) ABSTRACT

The present disclosure provides an electronic device and a modulation method. The electronic device includes: a receiving unit, which is configured to obtain a first input bit sequence; and a control unit, which is configured to perform pseudo N-order first type modulation on the first input bit sequence, wherein N first symbols that may be obtained by means of the pseudo N-order first type modulation are a portion of second symbols that may be obtained by means of M-order second type modulation, M and N are positive integers, and M is greater than N.

9 Claims, 8 Drawing Sheets

Method 800

Obtaining first input bit sequence ⟩ S801

Performing a pseudo N-order first-type modulation on the first input bit sequence, where the N first symbols obtainable by pseudo N-order first-type modulation are part of the M second symbols obtainable by M-order second-type modulation ⟩ S802

| $\frac{1}{\sqrt{160}}(1+1i)$ | $\frac{1}{\sqrt{160}}(3+1i)$ |
|---|---|
| $\frac{1}{\sqrt{160}}(1-1i)$ | $\frac{1}{\sqrt{160}}(3-1i)$ |
| $\frac{1}{\sqrt{160}}(1+3i)$ | $\frac{1}{\sqrt{160}}(3+3i)$ |
| $\frac{1}{\sqrt{160}}(1-3i)$ | $\frac{1}{\sqrt{160}}(3-3i)$ |
| $\frac{1}{\sqrt{160}}(-1+1i)$ | $\frac{1}{\sqrt{160}}(-3+1i)$ |
| $\frac{1}{\sqrt{160}}(-1-1i)$ | $\frac{1}{\sqrt{160}}(-3-1i)$ |
| $\frac{1}{\sqrt{160}}(-1+3i)$ | $\frac{1}{\sqrt{160}}(-3+3i)$ |
| $\frac{1}{\sqrt{160}}(-1-3i)$ | $\frac{1}{\sqrt{160}}(-3-3i)$ |

| $\frac{1}{\sqrt{160}}(3.4568+0.9263i)$ | $\frac{1}{\sqrt{160}}(-0.9263 - 3.4568i)$ |
|---|---|
| $\frac{1}{\sqrt{160}}(2.5306 + 2.5306i)$ | $\frac{1}{\sqrt{160}}(0.9263 - 3.4568i)$ |
| $\frac{1}{\sqrt{160}}(0.9263 + 3.4568i)$ | $\frac{1}{\sqrt{160}}(2.5306 - 2.5306i)$ |
| $\frac{1}{\sqrt{160}}(-0.9263 + 3.4568i)$ | $\frac{1}{\sqrt{160}}(3.4568 - 0.9263i)$ |
| $\frac{1}{\sqrt{160}}(-2.5306 + 2.5306i)$ | $\frac{1}{\sqrt{160}}(0.8879 + 0.8879i)$ |
| $\frac{1}{\sqrt{160}}(-3.4568 + 0.9263i)$ | $\frac{1}{\sqrt{160}}(-0.8879 + 0.8879i)$ |
| $\frac{1}{\sqrt{160}}(-3.4568 - 0.9263i)$ | $\frac{1}{\sqrt{160}}(-0.8879 - 0.8879i)$ |
| $\frac{1}{\sqrt{160}}(-2.5306 - 2.5306i)$ | $\frac{1}{\sqrt{160}}(0.8879 - 0.8879i)$ |

| index | input bits (pseudo 16APSK) | input bits (64QAM) | symbol | index | input bits (pseudo 16APSK) | input bits (64QAM) | symbol |
|---|---|---|---|---|---|---|---|
| 1 | 1100 | 000011 | $\frac{1}{\sqrt{38}}(1+1i)$ | 9 | 0010 | 101100 | $\frac{1}{\sqrt{38}}(-5+5i)$ |
| 2 | 1110 | 100011 | $\frac{1}{\sqrt{38}}(-1+1i)$ | 10 | 0110 | 101011 | $\frac{1}{\sqrt{38}}(-7+1i)$ |
| 3 | 1111 | 110011 | $\frac{1}{\sqrt{38}}(-1-1i)$ | 11 | 0111 | 111011 | $\frac{1}{\sqrt{38}}(-7-1i)$ |
| 4 | 1101 | 010011 | $\frac{1}{\sqrt{38}}(1-1i)$ | 12 | 0011 | 111100 | $\frac{1}{\sqrt{38}}(-5-5i)$ |
| 5 | 0100 | 001011 | $\frac{1}{\sqrt{38}}(7+1i)$ | 13 | 1011 | 110111 | $\frac{1}{\sqrt{38}}(-1-7i)$ |
| 6 | 0000 | 001100 | $\frac{1}{\sqrt{38}}(5+5i)$ | 14 | 1001 | 010111 | $\frac{1}{\sqrt{38}}(1-7i)$ |
| 7 | 1000 | 000111 | $\frac{1}{\sqrt{38}}(1+7i)$ | 15 | 0001 | 011100 | $\frac{1}{\sqrt{38}}(5-5i)$ |
| 8 | 1010 | 100111 | $\frac{1}{\sqrt{38}}(-1+7i)$ | 16 | 0101 | 011011 | $\frac{1}{\sqrt{38}}(7-1i)$ |

FIG. 5A

| index | input bits (pseudo 16APSK) | input bits (256QAM) | symbol | index | input bits (pseudo 16APSK) | input bits (256QAM) | symbol |
|---|---|---|---|---|---|---|---|
| 1 | 1100 | 00001100 | $\frac{1}{\sqrt{182}}(3+3i)$ | 9 | 0010 | 10110000 | $\frac{1}{\sqrt{182}}(-11+11i)$ |
| 2 | 1110 | 10001100 | $\frac{1}{\sqrt{182}}(-3+3i)$ | 10 | 0110 | 10101110 | $\frac{1}{\sqrt{182}}(-15+3i)$ |
| 3 | 1111 | 11001100 | $\frac{1}{\sqrt{182}}(-3-3i)$ | 11 | 0111 | 11101110 | $\frac{1}{\sqrt{182}}(-15-3i)$ |
| 4 | 1101 | 01001100 | $\frac{1}{\sqrt{182}}(3-3i)$ | 12 | 0011 | 11110000 | $\frac{1}{\sqrt{182}}(-11-11i)$ |
| 5 | 0100 | 00101110 | $\frac{1}{\sqrt{182}}(15+3i)$ | 13 | 1011 | 11011101 | $\frac{1}{\sqrt{182}}(-3-15i)$ |
| 6 | 0000 | 00110000 | $\frac{1}{\sqrt{182}}(11+11i)$ | 14 | 1001 | 01011101 | $\frac{1}{\sqrt{182}}(3-15i)$ |
| 7 | 1000 | 00011101 | $\frac{1}{\sqrt{182}}(3+15i)$ | 15 | 0001 | 01110000 | $\frac{1}{\sqrt{182}}(11-11i)$ |
| 8 | 1010 | 10011101 | $\frac{1}{\sqrt{182}}(-3+15i)$ | 16 | 0101 | 01101110 | $\frac{1}{\sqrt{182}}(15-3i)$ |

FIG. 5B

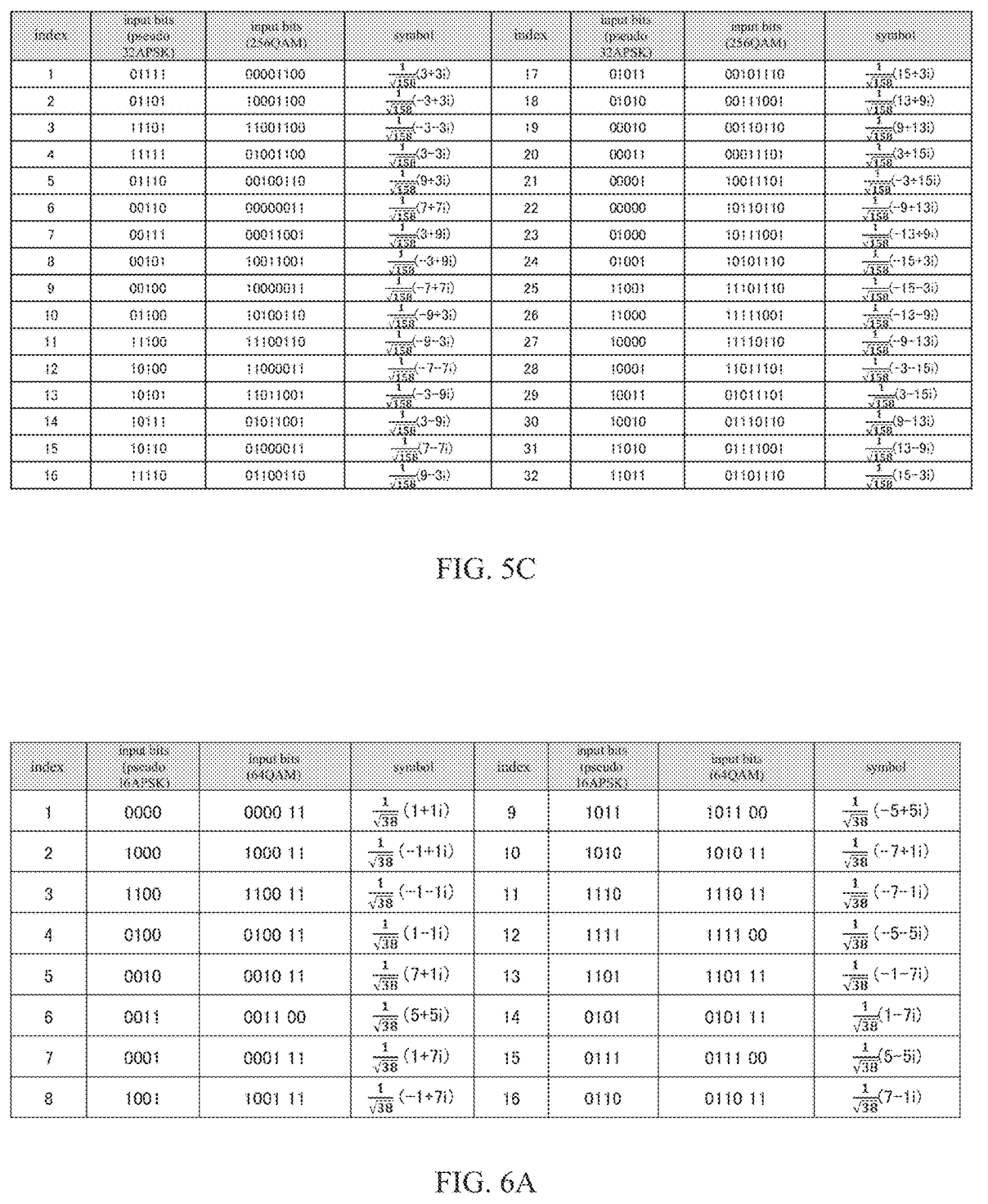

| index | input bits (pseudo 32APSK) | input bits (256QAM) | symbol | index | input bits (pseudo 32APSK) | input bits (256QAM) | symbol |
|---|---|---|---|---|---|---|---|
| 1 | 01111 | 00001100 | $\frac{1}{\sqrt{158}}(3+3i)$ | 17 | 01011 | 00101110 | $\frac{1}{\sqrt{158}}(15+3i)$ |
| 2 | 01101 | 10001100 | $\frac{1}{\sqrt{158}}(-3+3i)$ | 18 | 01010 | 00111001 | $\frac{1}{\sqrt{158}}(13+9i)$ |
| 3 | 11101 | 11001100 | $\frac{1}{\sqrt{158}}(-3-3i)$ | 19 | 00010 | 00110110 | $\frac{1}{\sqrt{158}}(9+13i)$ |
| 4 | 11111 | 01001100 | $\frac{1}{\sqrt{158}}(3-3i)$ | 20 | 00011 | 00011101 | $\frac{1}{\sqrt{158}}(3+15i)$ |
| 5 | 01110 | 00100110 | $\frac{1}{\sqrt{158}}(9+3i)$ | 21 | 00001 | 10011101 | $\frac{1}{\sqrt{158}}(-3+15i)$ |
| 6 | 00110 | 00000011 | $\frac{1}{\sqrt{158}}(7+7i)$ | 22 | 00000 | 10110110 | $\frac{1}{\sqrt{158}}(-9+13i)$ |
| 7 | 00111 | 00011001 | $\frac{1}{\sqrt{158}}(3+9i)$ | 23 | 01000 | 10111001 | $\frac{1}{\sqrt{158}}(-13+9i)$ |
| 8 | 00101 | 10011001 | $\frac{1}{\sqrt{158}}(-3+9i)$ | 24 | 01001 | 10101110 | $\frac{1}{\sqrt{158}}(-15+3i)$ |
| 9 | 00100 | 10000011 | $\frac{1}{\sqrt{158}}(-7+7i)$ | 25 | 11001 | 11101110 | $\frac{1}{\sqrt{158}}(-15-3i)$ |
| 10 | 01100 | 10100110 | $\frac{1}{\sqrt{158}}(-9+3i)$ | 26 | 11000 | 11111001 | $\frac{1}{\sqrt{158}}(-13-9i)$ |
| 11 | 11100 | 11100110 | $\frac{1}{\sqrt{158}}(-9-3i)$ | 27 | 10000 | 11110110 | $\frac{1}{\sqrt{158}}(-9-13i)$ |
| 12 | 10100 | 11000011 | $\frac{1}{\sqrt{158}}(-7-7i)$ | 28 | 10001 | 11011101 | $\frac{1}{\sqrt{158}}(-3-15i)$ |
| 13 | 10101 | 11011001 | $\frac{1}{\sqrt{158}}(-3-9i)$ | 29 | 10011 | 01011101 | $\frac{1}{\sqrt{158}}(3-15i)$ |
| 14 | 10111 | 01011001 | $\frac{1}{\sqrt{158}}(3-9i)$ | 30 | 10010 | 01110110 | $\frac{1}{\sqrt{158}}(9-13i)$ |
| 15 | 10110 | 01000011 | $\frac{1}{\sqrt{158}}(7-7i)$ | 31 | 11010 | 01111001 | $\frac{1}{\sqrt{158}}(13-9i)$ |
| 16 | 11110 | 01100110 | $\frac{1}{\sqrt{158}}(9-3i)$ | 32 | 11011 | 01101110 | $\frac{1}{\sqrt{158}}(15-3i)$ |

FIG. 5C

| index | input bits (pseudo 16APSK) | input bits (64QAM) | symbol | index | input bits (pseudo 16APSK) | input bits (64QAM) | symbol |
|---|---|---|---|---|---|---|---|
| 1 | 0000 | 0000 11 | $\frac{1}{\sqrt{38}}(1+1i)$ | 9 | 1011 | 1011 00 | $\frac{1}{\sqrt{38}}(-5+5i)$ |
| 2 | 1000 | 1000 11 | $\frac{1}{\sqrt{38}}(-1+1i)$ | 10 | 1010 | 1010 11 | $\frac{1}{\sqrt{38}}(-7+1i)$ |
| 3 | 1100 | 1100 11 | $\frac{1}{\sqrt{38}}(-1-1i)$ | 11 | 1110 | 1110 11 | $\frac{1}{\sqrt{38}}(-7-1i)$ |
| 4 | 0100 | 0100 11 | $\frac{1}{\sqrt{38}}(1-1i)$ | 12 | 1111 | 1111 00 | $\frac{1}{\sqrt{38}}(-5-5i)$ |
| 5 | 0010 | 0010 11 | $\frac{1}{\sqrt{38}}(7+1i)$ | 13 | 1101 | 1101 11 | $\frac{1}{\sqrt{38}}(-1-7i)$ |
| 6 | 0011 | 0011 00 | $\frac{1}{\sqrt{38}}(5+5i)$ | 14 | 0101 | 0101 11 | $\frac{1}{\sqrt{38}}(1-7i)$ |
| 7 | 0001 | 0001 11 | $\frac{1}{\sqrt{38}}(1+7i)$ | 15 | 0111 | 0111 00 | $\frac{1}{\sqrt{38}}(5-5i)$ |
| 8 | 1001 | 1001 11 | $\frac{1}{\sqrt{38}}(-1+7i)$ | 16 | 0110 | 0110 11 | $\frac{1}{\sqrt{38}}(7-1i)$ |

FIG. 6A

| index | input bits (pseudo 16APSK) | input bits (256QAM) | symbol | index | input bits (pseudo 16APSK) | input bits (256QAM) | symbol |
|---|---|---|---|---|---|---|---|
| 1 | 0000 | 0000 1100 | $\frac{1}{\sqrt{182}}(3+3i)$ | 9 | 1011 | 1011 0000 | $\frac{1}{\sqrt{182}}(-11+11i)$ |
| 2 | 1000 | 1000 1100 | $\frac{1}{\sqrt{182}}(-3+3i)$ | 10 | 1010 | 1010 1110 | $\frac{1}{\sqrt{182}}(-15+3i)$ |
| 3 | 1100 | 1100 1100 | $\frac{1}{\sqrt{182}}(-3-3i)$ | 11 | 1110 | 1110 1110 | $\frac{1}{\sqrt{182}}(-15-3i)$ |
| 4 | 0100 | 0100 1100 | $\frac{1}{\sqrt{182}}(3-3i)$ | 12 | 1111 | 1111 0000 | $\frac{1}{\sqrt{182}}(-11-11i)$ |
| 5 | 0010 | 0010 1110 | $\frac{1}{\sqrt{182}}(15+3i)$ | 13 | 1101 | 1101 1101 | $\frac{1}{\sqrt{182}}(-3-15i)$ |
| 6 | 0011 | 0011 0000 | $\frac{1}{\sqrt{182}}(11+11i)$ | 14 | 0101 | 0101 1101 | $\frac{1}{\sqrt{182}}(3-15i)$ |
| 7 | 0001 | 0001 1101 | $\frac{1}{\sqrt{182}}(3+15i)$ | 15 | 0111 | 0111 0000 | $\frac{1}{\sqrt{182}}(11-11i)$ |
| 8 | 1001 | 1001 1101 | $\frac{1}{\sqrt{182}}(-3+15i)$ | 16 | 0110 | 0110 1110 | $\frac{1}{\sqrt{182}}(15-3i)$ |

FIG. 6B

| MCS indication $I_{MCS}$ | modulation order Qm | target bitrate R × [1024] | spectrum efficiency | MCS indication $I_{MCS}$ | modulation order Qm | target bitrate R × [1024] | spectrum efficiency |
|---|---|---|---|---|---|---|---|
| 0 | 2 | 120 | 0.234 | 16 | 16APSK_256QAM | 853 | 2.5?8 |
| 1 | 2 | 157 | 0.307 | 17 | 16APSK_256QAM | 826 | 3.227 |
| 2 | 2 | 193 | 0.377 | 18 | 16APSK_256QAM | 86? | 3.3?? |
| 3 | 2 | 251 | 0.49 | 19 | 16APSK_256QAM | 896 | 3.5 |
| 4 | 2 | 308 | 0.602 | 20 | 16APSK_256QAM | 4?8 | 7.?86 |
| 5 | 2 | 379 | 0.74 | 21 | 64APSK_256QAM | 464 | 2.7?1 |
| 6 | 2 | 449 | 0.877 | 22 | 64APSK_256QAM | 5?7 | 3.0?9 |
| 7 | 2 | 526 | 1.027 | 23 | 6 | 567 | 3.322 |
| 8 | 2 | 602 | 1.176 | 24 | 6 | 616 | 3.609 |
| 9 | 2 | 679 | 1.326 | 25 | 6 | 686 | 3.902 |
| 10 | 18 | 16APSK_256QAM | 3?? | 26 | 6 | 719 | 4.213 |
| 11 | 20 | 16APSK_256QAM | 372 | 27 | 6 | 772 | 4.523 |
| 12 | 21 | 16APSK_256QAM | 43? | 28 | 6 | 822 | 4.816 |
| 13 | 22 | 16APSK_256QAM | 480 | 29 | 6 | 873 | 5.115 |
| 14 | 23 | 16APSK_256QAM | 55? | 30 | 6 | 910 | 5.332 |
| 15 | 24 | 16APSK_256QAM | 6?8 | 31 | 6 | 948 | 5.555 |

FIG. 7A

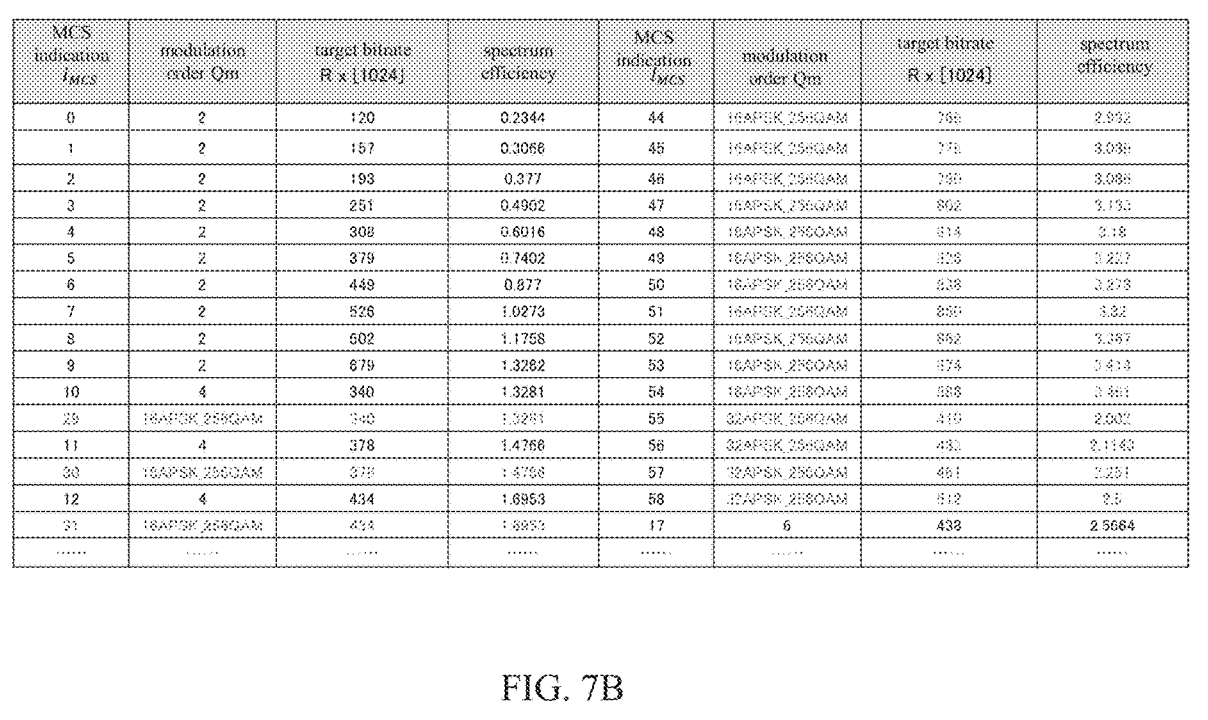

| MCS indication $I_{MCS}$ | modulation order Qm | target bitrate R x [1024] | spectrum efficiency | MCS indication $I_{MCS}$ | modulation order Qm | target bitrate R x [1024] | spectrum efficiency |
|---|---|---|---|---|---|---|---|
| 0 | 2 | 120 | 0.2344 | 44 | 16APSK_256QAM | 766 | 2.992 |
| 1 | 2 | 157 | 0.3066 | 45 | 16APSK_256QAM | 778 | 3.038 |
| 2 | 2 | 193 | 0.377 | 46 | 16APSK_256QAM | 790 | 3.086 |
| 3 | 2 | 251 | 0.4902 | 47 | 16APSK_256QAM | 802 | 3.133 |
| 4 | 2 | 308 | 0.6016 | 48 | 16APSK_256QAM | 814 | 3.18 |
| 5 | 2 | 379 | 0.7402 | 49 | 16APSK_256QAM | 826 | 3.227 |
| 6 | 2 | 449 | 0.877 | 50 | 16APSK_256QAM | 838 | 3.273 |
| 7 | 2 | 526 | 1.0273 | 51 | 16APSK_256QAM | 850 | 3.32 |
| 8 | 2 | 602 | 1.1758 | 52 | 16APSK_256QAM | 862 | 3.367 |
| 9 | 2 | 679 | 1.3262 | 53 | 16APSK_256QAM | 874 | 3.414 |
| 10 | 4 | 340 | 1.3281 | 54 | 16APSK_256QAM | 888 | 3.469 |
| 29 | 16APSK_256QAM | 340 | 1.3281 | 55 | 32APSK_256QAM | 419 | 2.003 |
| 11 | 4 | 378 | 1.4766 | 56 | 32APSK_256QAM | 430 | 2.1163 |
| 30 | 16APSK_256QAM | 378 | 1.4766 | 57 | 32APSK_256QAM | 461 | 2.251 |
| 12 | 4 | 434 | 1.6953 | 58 | 16APSK_256QAM | 512 | 2.5 |
| 31 | 16APSK_256QAM | 434 | 1.6953 | 17 | 6 | 438 | 2.5664 |
| ...... | ...... | ...... | ...... | ...... | ...... | ...... | ...... |

FIG. 7B

Method 800

ELECTRONIC DEVICE AND MODULATION METHOD

TECHNICAL FIELD

The present disclosure relates to the field of wireless communications, and more particularly to a modulation method and corresponding electronic device.

BACKGROUND

In order to ensure high data rates, in the 6G communication system, it is required to make full use of all spectrums available for communication, such as centimeter wave (Sub-6 GHz), millimeter wave (mm Wave), terahertz (THz), optical Communication frequency bands, etc. However, operating in high-frequency bands will bring a series of non-ideal behaviors to hardware devices. For example, problems such as nonlinear distortion caused by high-power amplifiers. This makes mathematical modeling difficult and seriously affects system power efficiency and transmission performance.

On the other hand, there are two main types of constellation modulation schemes currently proposed. The first type of constellation modulation scheme is a constellation modulation scheme aimed at high spectral efficiency, such as Quadrature Amplitude Modulation (QAM), non-uniform constellation (NUC) modulation based on geometric shaping, etc.

For example, QAM has been used in various broadband wireless communication systems such as LTE, HSPA, 802.11n, and 5G. In QAM, by combining amplitude and phase parameters, the entire signal plane is fully utilized and all vector endpoints are redistributed reasonably. Thus, without reducing the minimum Euclidean distance of the endpoint positions, the number of endpoints of the signal vector is increased, and the anti-interference ability and spectrum utilization of the system are improved. However, QAM has a high Peak to Average Power Ratio (PAPR) for OFDM systems, resulting in the nonlinear distortion generated by high-power amplifiers having a significant negative impact on system transmission.

In addition, the second type of constellation modulation scheme is a constellation modulation scheme for low peak-to-average ratio (PAPR), such as amplitude-phase keying (APSK) modulation, constellation extension modulation, etc. For example, APSK modulation uses maximization of Euclidean distance and maximization of mutual information (i.e., channel capacity) as optimization criteria to determine the number of circles, number of points on the ring, relative radius ratio, and relative phase offset of the constellation. Low PAPR modulation schemes can be considered in scenarios where high-power amplifiers are used in mMTC, satellite communications, etc., and low hardware loss and long battery life are required.

However, although APSK modulation can effectively reduce PAPR, the current APSK constellation modulation has not been adopted by standards such as 5G, and APSK modulation is incompatible with constellation modulation schemes aimed at high spectral efficiency such as QAM. This results in electronic devices that may require different transceiver structures for different modulation methods, which makes hardware design complex.

SUMMARY OF THE DISCLOSURE

According to an aspect of the present disclosure, an electronic device is provided, including: a receiving unit configured to obtain a first input bit sequence; and a control unit configured to perform pseudo N-order first-type modulation on the first input bit sequence, wherein N first symbols obtainable by the pseudo N-order first-type modulation are part of M second symbols obtainable by M-order second-type modulation, wherein M and N are positive integers, and M is greater than N.

According to another aspect of the present disclosure, the control unit of the electronic device performs the pseudo N-order first-type modulation on the first input bit sequence according to a bit-to-symbol mapping formula or a bit-to-symbol mapping table.

According to another aspect of the present disclosure, according to the pseudo N-order first-type modulation, a bit-to-symbol mapping is performed in units of p first bits; according to the M-order second-type modulation, a bit-to-symbol mapping is performed in units of q second bits; for the same symbol obtained according to the pseudo N-order first-type modulation and according to the M-order second-type modulation, the p first bits are a function of at least part of the q second bits, wherein p and q are positive integers and q is greater than p. In this case, for example, the bit-to-symbol mapping formula or the bit-to-symbol mapping table of the pseudo N-order first-type modulation corresponds to the bit-to-symbol mapping formula or the bit-to-symbol mapping table of the M-order second-type modulation.

According to another aspect of the present disclosure, according to the pseudo N-order first-type modulation, a bit-to-symbol mapping is performed in units of p first bits; according to the M-order second-type modulation, a bit-to-symbol mapping is performed in units of p first bits; for the same symbol obtained according to the pseudo N-order first-type modulation and according to the M-order second-type modulation, the p first bits are the same as the first p second bits of the q second bits, wherein p and q are positive integers, and q is greater than p. In this case, for example, the bit-to-symbol mapping table of the pseudo N-order first-type modulation corresponds to the bit-to-symbol mapping table of the M-order second-type modulation. According to another aspect of the present disclosure, the electronic device further includes: a receiving unit configured to receive modulation and coding strategy signaling, and the control unit to perform the pseudo N-order first-type modulation on the first input bit sequence according to the modulation and coding strategy signaling and a predetermined modulation and coding strategy table, wherein the first-type modulation is APSK modulation, and the predetermined modulation and coding strategy table at least includes information regarding pseudo N-order APSK Modulation parameters.

According to another aspect of the present disclosure, the predetermined modulation and coding strategy table is a table regarding some or all of the modulation and coding strategies supported by the communication system where the electronic device is located.

According to another aspect of the present disclosure, a modulation method is provided, including: obtaining a first input bit sequence; performing pseudo N-order first-type modulation on the first input bit sequence, wherein N first symbols obtainable by the pseudo N-order first-type modulation are part of second symbols obtainable by M-order second-type modulation, wherein M and N are positive integers, and M is greater than N.

According to another aspect of the present disclosure, the pseudo N-order first-type modulation is performed on the first input bit sequence according to a bit-to-symbol mapping formula or a bit-to-symbol mapping table.

BRIEF DESCRIPTION OF THE DRAWINGS

The above and other objects, features, and advantages of the present disclosure will become more apparent through a more detailed description of the embodiments of the present disclosure in conjunction with the accompanying drawings. The accompanying drawings are used to provide further understanding of the embodiments of the present disclosure and constitute part of the specification. They are used to explain the disclosure together with the embodiments of the present disclosure and do not constitute a limitation to the disclosure. In the drawings, like reference numbers generally represent like components or steps.

FIG. 5A is a schematic diagram showing a bit-to-symbol mapping table of pseudo 16APSK modulation obtained according to the 64QAM bit-to-symbol mapping table in the 3GPP standards.

FIG. 5B is a schematic diagram showing a bit-to-symbol mapping table of pseudo 16APSK modulation obtained according to the 256QAM bit-to-symbol mapping table in the 3GPP standards.

FIG. 5C shows a schematic diagram showing a bit-to-symbol mapping table of pseudo 32APSK modulation obtained according to the 256QAM bit-to-symbol mapping table in the 3GPP standards.

FIG. 6A is a schematic diagram showing a bit-to-symbol mapping table of pseudo 16APSK modulation obtained according to the 64QAM bit-to-symbol mapping table in the 3GPP standards.

FIG. 6B is a schematic diagram showing a bit-to-symbol mapping table of pseudo 16APSK modulation obtained according to the 256QAM bit-to-symbol mapping table in the 3GPP standards.

FIGS. 7A and 7B are diagrams illustrating modulation and coding strategies according to embodiments of the present disclosure.

DESCRIPTION OF THE EMBODIMENTS

Figures 1A, 1B:
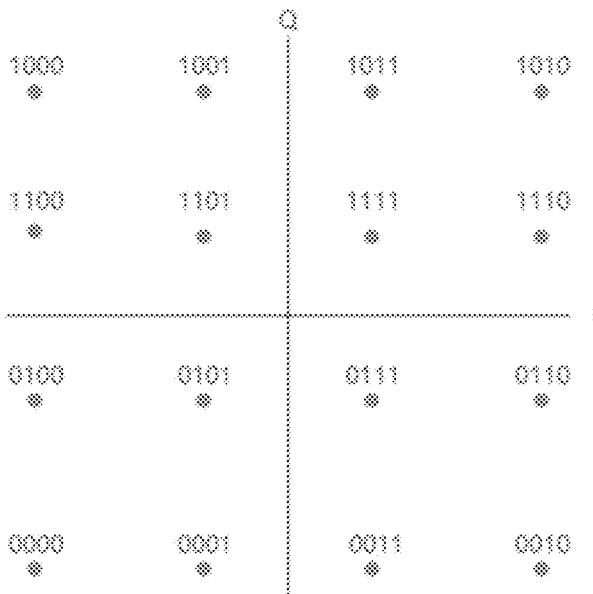
FIG. 1A is a schematic bit-to-symbol mapping constellation diagram showing 16QAM.
FIG. 1B shows symbol values after 16QAM bit-to-symbol mapping.

In order to make the objects, technical solutions, and advantages of the present disclosure more apparent, example embodiments according to the present disclosure will be described in detail below with reference to the accompanying drawings. In the drawings, like reference numbers refer to like elements throughout. It should be understood that the embodiments described herein are illustrative only and should not be construed as limiting the scope of the present disclosure.

Figures 2A, 2B:
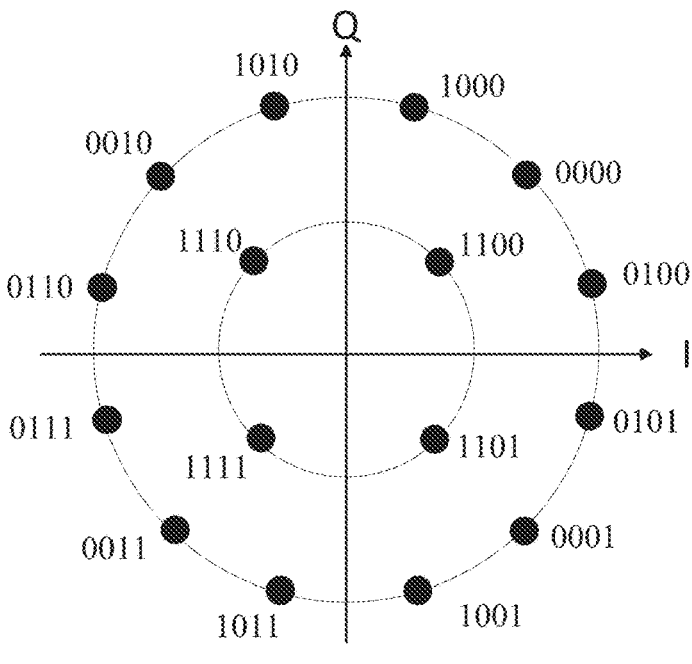
FIG. 2A is a schematic bit-to-symbol mapping constellation diagram showing 16APSK modulation.
FIG. 2B shows symbol values after 16APSK modulation bit-to-symbol mapping.

Examples of QAM and APSK modulations are described with reference to FIGS. 1A, 1B, 2A, and 2B. FIG. 1A is a schematic bit-to-symbol mapping constellation diagram showing 16QAM in the 3GPP standards. FIG. 1B shows symbol values after 16QAM bit-to-symbol mapping. FIG. 2A is a schematic bit-to-symbol mapping constellation diagram showing 16APSK modulation in the DVB-S2 standard. FIG. 2B shows symbol values after 16APSK modulation bit-to-symbol mapping. As shown with reference to FIG. 1A, FIG. 1B, FIG. 2A, and FIG. 2B, symbols obtained through the QAM and APSK modulations are different, and the bit-to-symbol mapping methods of the QAM and APSK modulations are also different. For example, the value of the real part or imaginary part (I/Q) of the symbol that has undergone the QAM modulation as shown in FIG. 1B is an integer, while the value of the real part or imaginary part (I/Q) of the symbol that has undergone the APSK modulation as shown in FIG. 2B is not a certain integer. In addition, the independent phase and amplitude bit-to-symbol mapping method in the APSK modulation is also different from that in the QAM.

As mentioned above, although the APSK modulation can effectively reduce low peak-to-average ratio (PAPR), the current APSK modulation has not been adopted by the 3GPP standards such as 5G NR, and the APSK modulation is not compatible with the constellation modulation schemes such as QAM aimed at high spectral efficiency. Therefore, it is desired to provide a modulation method and a corresponding electronic device that simultaneously meet different needs and are compatible with the modulation methods in existing communication standards.

Figure 3:
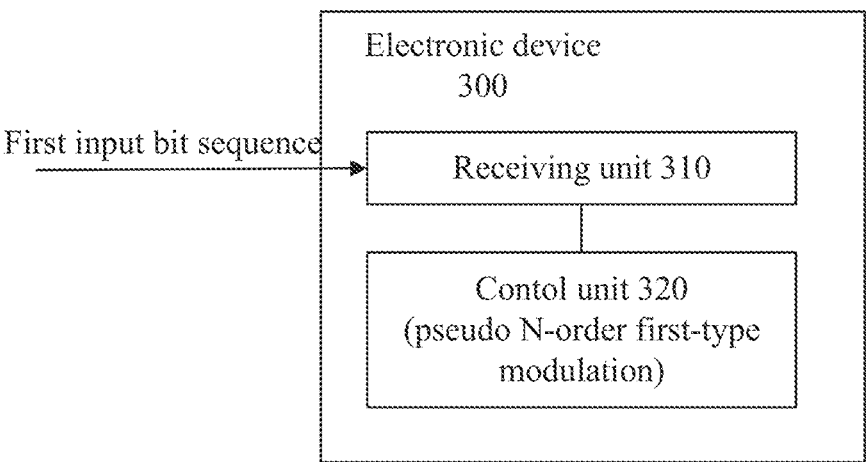
FIG. 3 is a schematic block diagram illustrating an electronic device according to one embodiment of the present disclosure.

Hereinafter, an electronic device according to embodiments of the present disclosure is illustrated with reference to FIG. 3. FIG. 3 is a schematic block diagram illustrating an electronic device according to one embodiment of the present disclosure. As shown in FIG. 3, an electronic device 300 according to one embodiment of the present disclosure may include a receiving unit 310 and a control unit 320. In addition to the receiving unit and the control unit, the electronic device 300 may also include other components. However, since these components are not related to the content of the embodiments of the present disclosure, their illustration and description are omitted here. Furthermore, in the embodiments according to the present disclosure, the electronic device 300 may be a base station or a terminal in a communication system, or the like. The base stations described herein may provide communications coverage for a specific geographic area, which may be referred to as a cell, Node B, gNB, 5G Node B, access point, and/or transmission/reception point, or the like. The terminals described here may include various types of terminals, such as user equipment (UE), mobile terminals (or mobile stations), or fixed terminals. However, for convenience, the terminal and the UE are sometimes used interchangeably in the following.

As shown in FIG. 3, the receiving unit 310 of the electronic device 300 can obtain a first input bit sequence. Then, the control unit 320 may perform pseudo N-order first-type modulation on the first input bit sequence. For example, the electronic device 300 is a base station, and the receiving unit 310 can obtain the first input bit sequence. The control unit 320 may perform pseudo N-order first-type modulation on the first input bit sequence to obtain the first symbol to be sent to the UE connected to the base station. In an embodiment of the present disclosure, the N first symbols obtainable by pseudo N-order first-type modulation are part of the M second symbols obtainable by M-order second-type modulation, where M and N are positive integers, and M is greater than N. That is, the first-type modulation and the second-type modulation may be different modulation methods. In an embodiment according to the present disclosure, the symbols obtainable using the N-order first-type modulation may be simulated by part of the M second symbols obtainable using the M-order second-type modulation. In embodiments according to the present disclosure, this N-order first-type modulation performed in a simulation manner may be called pseudo N-order first-type modulation, or N-order first-type modulation based on M-order second-type modulation. (i.e., N-first modulation_M-second modulation).

For example, the second-type modulation may be traditional QAM, and the first-type modulation may be APSK modulation, circular QAM, or spiral QAM, etc. In embodiments of the present disclosure, symbols that can be obtained using modulation methods such as N-order APSK modulation, circular QAM, or spiral QAM can be simulated by using part of the M second symbols that can be obtained by using M-order QAM.

Figure 4:
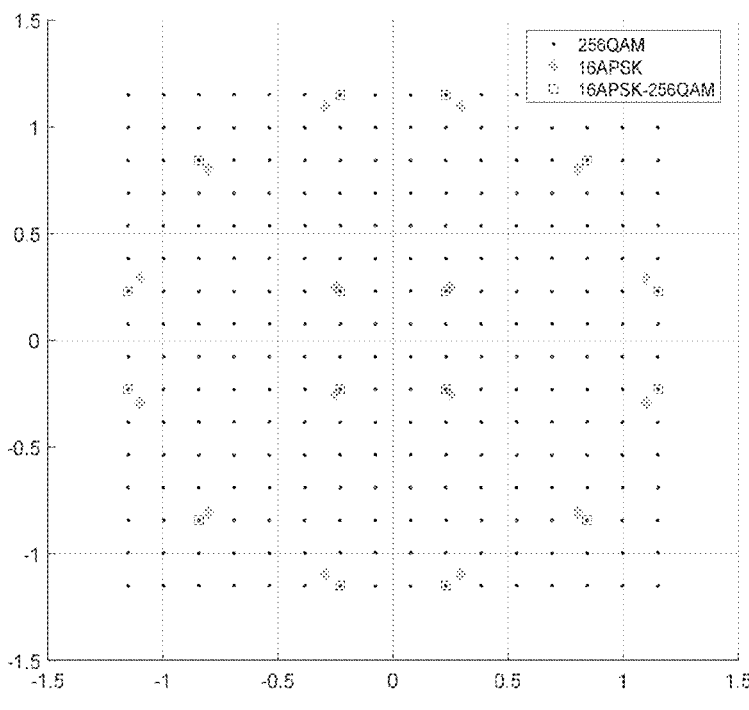
FIG. 4 is a schematic diagram illustrating the selection of pseudo 16APSK constellation points from constellation points of 256QAM according to one embodiment of the present disclosure.

FIG. 4 is a schematic diagram illustrating the selection of pseudo 16APSK constellation points from constellation points of 256QAM according to an embodiment of the present disclosure. In the constellation diagram shown in FIG. 4, the black dots show the constellation points obtained by performing bit-to-symbol mapping according to 256QAM, and the gray diamonds show the constellation points obtained by performing bit-to-symbol mapping according to 16APSK modulation. Among the constellation points obtained by performing bit-to-symbol mapping according to 256QAM, points that meet predetermined conditions can be selected as constellation points for pseudo 16APSK modulation. For example, among the constellation points obtained by performing bit-to-symbol mapping according to 256QAM, the point with the smallest Euclidean distance from the constellation point obtained by performing bit-to-symbol mapping according to 16APSK modulation can be selected as the constellation points of the pseudo 16APSK modulation. In the example shown in FIG. 4, the constellation with the minimum Euclidean distance from the constellation point obtained according to the 16APSK modulation as a pseudo 16APSK modulation (i.e., 16APSK_256QAM) is shown as a small black dot with a square added around its point.

In the example described above in conjunction with FIGS. 3 and 4, by using part of the M numbers of the second symbols that can be obtained by using M-order second-type modulation to simulate symbols that can be obtained by using N-order first-type modulation, constellation modulation that meets different needs can be obtained while ensuring compatibility. For example, for a communication system that needs to have a low PAPR, N-order APSK constellation points can be selected from the M-order QAM constellation to achieve the advantages of APSK while ensuring compatibility, such as low PAPR. For another example, for a communication system that needs to be resistant to phase noise, N-order Spiral QAM constellation points can be selected in the M-order QAM constellation to achieve the advantages of resisting phase noise while ensuring compatibility.

When modulating according to the pseudo N-order first-type bit-to-symbol mapping may be performed in units of p first bits. Furthermore, when modulating according to the M-order second-type bit-to-symbol mapping may be performed in units of q second bits. p and q are positive integers, and q is greater than p. For example, in the example shown in FIG. 4, 16APSK modulation performs bit-to-symbol mapping in units of 4 bits. Correspondingly, pseudo 16APSK modulation also performs bit-to-symbol mapping in units of 4 first bits. In addition, 256QAM performs bit-to-symbol mapping in units of 8 second bits.

According to one embodiment of the present disclosure, for the same symbol obtained according to the pseudo N-order first-type modulation and according to the M-order second-type modulation, the p first bits are a function of at least part of the q second bits.

For example, in case the pseudo N-order first-type modulation is pseudo 16APSK modulation and the M-order second-type modulation is 64QAM, for pseudo 16APSK modulation, the bit-to-symbol mapping can be performed in units of 4 first bits b(4i), b(4i+1), b(4i+2), b(4i+3), where i is an integer greater than or equal to 0. Additionally, for 64QAM, the bit-to-symbol mapping can be performed in units of 6 second bits c(6i), c(6i+1), c(6i+2), c(6i+3), c(6i+4), c(6i+5). In case the first symbol obtainable by pseudo 16APSK modulation is part of the second symbol obtainable by 64QAM, for the same symbols obtainable by pseudo 16APSK modulation and 64QAM, the 4 first bits can be a function of at least part of the 6 second bits. For example, the relationship between each bit of the first bits and the second bits can be expressed by the following formula (1):

$$b(4i) = \tilde{c}(6i + 2); \tag{1}$$
$$b(4i + 1) = \tilde{c}(6i + 3),$$
$$b(4i + 2) = c(6i);$$
$$b(4i + 3) = c(6i + 1);$$

where "~" represents the logical operator "not".

As shown in the above formula (1), pseudo 16APSK modulation performs bit-to-symbol mapping in units of 4 first bits, 64QAM performs bit-to-symbol mapping in units of 6 second bits, and for the same symbols obtainable by pseudo 16APSK modulation and 64QAM both, the 4 first bits of pseudo 16APSK modulation can be a function of the first 4 bits c(6i), c(6i+1), c(6i+2), c(6i+3) of the 6 second bits of 64QAM.

Additionally or alternatively, for the same symbols obtainable by pseudo 16APSK modulation and 64QAM, the 4 first bits of pseudo 16APSK modulation may also correspond to all of the 6 second bits using 64QAM. For example, based on the above formula (1), the following formula (2) can also be used to indicate the relationship between each bit of the first bits and the following two bits c(6i+4), c(6i+5) of the second bits:

$$c(6i + 4) = c(6i + 5) = b(4i) \vee b(4i + 1) \tag{2}$$

Where "$\vee$" represents the logical operator "or".

For another example, in case the pseudo N-order first-type modulation is pseudo 16APSK modulation and the M-order second-type modulation is 256QAM, for pseudo 16APSK modulation, bit-to-symbol mapping can be performed in units of 4 first bits b(4i), b(4i+1), b(4i+2), b(4i+3), where i is an integer greater than or equal to 0. Additionally, for 256QAM, bit-to-symbol mapping can be performed in units of 8 second bits c(8i), c(8i+1), c(8i+2), c(8i+3), c(8i+4), c(8i+5), c(8i+6), c(8i+7). In case the first symbol obtainable by pseudo 16APSK modulation is part of the second symbol obtainable by 256QAM, for the same symbols obtainable by the pseudo 16APSK modulation and the 256QAM both, the 4 first bits can be a function of at least part of the 8 second bits. For example, the relationship between each bit of the first bits and the second bits can be expressed by the following formula (3):

$$b(4i) = \tilde{c}(8i + 2); \qquad (3)$$

$$b(4i + 1) = \tilde{c}(8i + 3)$$

$$b(4i + 2) = c(8i),$$

$$b(4i + 3) = c(8i + 1);$$

where "~" represents the logical operator "not".

As shown in the above formula (3), pseudo 16APSK modulation performs bit-to-symbol mapping in units of 4 first bits, and 256QAM performs bit-to-symbol mapping in units of 8 second bits, and for the same symbols obtainable by pseudo 16APSK modulation and 256QAM both, the 4 first bits of pseudo 16APSK modulation can be a function of the first 4 bits c(8i), c(8i+1), c(8i+2), c(8i+3) of the 8 second bits of 256QAM.

Additionally or alternatively, for the same symbol obtainable by pseudo 16APSK modulation and 256QAM both, the 4 first bits of pseudo 16APSK modulation may also correspond to all of the 8 second bits using 256QAM. For example, based on the above formula (3), the following formula (4) can also be used to express the relationship between each bit of the first bits and the following 4 bits b(8i+4), b(8i+5), b(8i+6), b(8i+7) of the second bits:

$$c(8i + 4) = c(8i + 5) = b(4i) \vee b(4i + 1); \qquad (4)$$

$$c(8i + 6) = \tilde{b}(4i) \wedge \left(b(4i), \bigoplus b(4i + 1)\right);$$

$$c(8i + 7) = \tilde{b}(4i + 1) \wedge (b(4i + 1) \oplus b(4i + 1))$$

where "⊕" represents the logical operator "XOR".

According to an example of the present disclosure, the control unit 320 may perform pseudo N-order first-type modulation on the first input bit sequence according to a bit-to-symbol mapping formula or a bit-to-symbol mapping table.

Due to what is described above in combination with formulas (1)-(4), for the same symbol, the p first bits correspond to at least part of the q second bits. Therefore, the symbol mapping formula or bit-to-symbol mapping table for the pseudo first-type modulation can be obtained according to the respective symbol mapping formula or bit-to-symbol mapping table for second-type modulation.

For example, the bit-to-symbol mapping formula of 64QAM is as shown in the following formula (5):

$$d(i) = \frac{1}{\sqrt{42}}\{(1 - 2c(6i))[4 - (1 - 2c(6i + 2))[2 - (1 - 2c(6i + 4))]] + \qquad (5)$$

-continued $$j(1 - 2c(6i + 1))[4 - (1 - 2c(6i + 3))[2 - (1 - 2c(6i + 5))]]\}$$

The symbol mapping formula of the pseudo 16APSK modulation can be obtained based on the relationship between the first bits of pseudo 16APSK modulation and the second bits of 64QAM shown in the above formulas (1) and (2), and according to the bit-to-symbol mapping formula of 64QAM shown in formula (5). Specifically, the bit-to-symbol mapping formula of 16APSK is as shown in the following formula (6):

$$d(i) = \frac{1}{\sqrt{38}}\{(1 - 2b(4i + 2))[4 - (1 - 2A)[2 - (1 - 2C)]] + \qquad (6)$$

$$j(1 - 2b(4i + 3))[4 - (1 - 2B)[2 - (1 - 2C)]]\}$$

where,

As another example, the bit-to-symbol mapping formula of 256QAM is as shown in the following formula (7):

$$A = \tilde{b}(4i) \qquad (7)$$

$$B = \tilde{b}(4i + 1)$$

$$C = b(4i) \vee b(4i + 1)$$

$$D = b(4i) \oplus b(4i + 1)$$

$$d(i) = \frac{1}{\sqrt{170}}\{(1 - 2c(8i))[8 - (1 - 2c(8i + 2))[4 -$$

$$(1 - 2c(8i + 4))[2 - (1 - 2c(8i + 6))]]] + j(1 - 2c(8i + 1))[8 -$$

$$(1 - 2c(8i + 3))[4 - (1 - 2c(8i + 5))[2 - (1 - 2c(8i + 7))]]]\}$$

The symbol mapping formula of the pseudo 16APSK modulation can be obtained based on the relationship between the first bits of pseudo 16APSK modulation and the second bits of 256QAM shown in the above formulas (3) and (4), and according to the bit-to-symbol mapping formula of 256QAM shown in formula (7). Specifically, the bit-to-symbol mapping formula of 16APSK is as shown in the following formula (8):

$$d(i) = \qquad (8)$$

$$\frac{1}{\sqrt{182}}\{(1 - 2b(4i + 2))[8 - (1 - 2A)[4 - (1 - 2C)[2 - (1 - 2(A \wedge D))]]] +$$

$$j(1 - 2b(4i + 3))[8 - (1 - 2B)[4 - (1 - 2C)[2 - (1 - 2(B \wedge D))]]]\}$$

where, $$A = \tilde{b}(4i)$$

$$B = \tilde{b}(4i + 1)$$

$$C = b(4i) \vee b(4i + 1)$$

$$D = b(4i) \oplus b(4i + 1)$$

In addition, FIGS. 5A to 5C illustrate a schematic diagram of obtaining a corresponding bit-to-symbol mapping table of the pseudo first-type modulation according to the bit-to-symbol mapping table of the second-type modulation according to an example of the present disclosure. FIGS. 5A to 5C exemplarily illustrate obtaining a bit-to-symbol mapping table of pseudo APSK modulation according to the bit-to-symbol mapping table of QAM in the 3GPP standards.

Specifically, FIG. 5A is a schematic diagram showing a bit-to-symbol mapping table of pseudo 16APSK modulation obtained according to the 64QAM bit-to-symbol mapping table in the 5G NR standards of 3GPP. In the example shown in FIG. 5A, the symbol mapping formula of pseudo 16APSK modulation can be obtained based on the relationship between the first bits of pseudo 16APSK modulation and the second bits of 64QAM shown in the above formulas (1) and (2) and according to the bit-to-symbol mapping table of 64QAM in the 5G NR standard. As shown in FIG. 5A, using the bit-to-symbol mapping table of 64QAM to map the second bits 000011, the symbol $$\frac{1}{\sqrt{38}}(1 + 1i)$$

can be obtained. According to the relationship between the first bits of pseudo 16APSK modulation and the second bits of 64QAM shown in the above formulas (1) and (2), it can be obtained that the first bits of pseudo 16APSK modulation corresponding to the second bits 000011 is 1100. That is, by using pseudo 16APSK modulation to map the first bits 1100, the symbol $$\frac{1}{\sqrt{38}}(1 + 1i)$$

can also be obtained. It is to be understood that as shown in formula (5), the power normalization factor for 64QAM is $$\frac{1}{\sqrt{42}},$$

and as shown in formula (6), the power normalization factor for pseudo 16APSK is $$\frac{1}{\sqrt{38}}.$$

Since the table shown in FIG. 5A is the bit-to-symbol mapping table of the pseudo 16APSK modulation obtained based on the bit-to-symbol mapping table of 64QAM, $$\frac{1}{\sqrt{38}}$$

is used as the factor for the symbol in the table shown in FIG. 5A. When performing the bit-to-symbol mapping according to 64QAM, the corresponding symbol with a factor $$\frac{1}{\sqrt{38}}$$

can also be obtained based on the second bits, but this symbol is not power normalized for 64QAM.

Alternatively, in the example shown in FIG. 5A, the symbol mapping formula of the pseudo 16APSK modulation can be obtained merely according to the relationship between the first bits of the pseudo 16APSK modulation and part of the second bits of 64QAM as shown in the above formula (1) and according to the bit-to-symbol mapping table of 64QAM in the 5G NR standards. As shown in FIG. 5A, using the bit-to-symbol mapping table of 64QAM to map the second bits 000011, the symbol $$\frac{1}{\sqrt{38}}(1 + 1i)$$

can be obtained. Based only on the relationship between the first bits of pseudo 16APSK modulation and the first 4 bits of the second bits of 64QAM as shown in the above formula (1), the first bits of pseudo 16APSK modulation corresponding to the second bits 000011 can be obtained as 1100. That is, based only on the first 4 bits "0000" of the second bits 000011, the corresponding first bits of pseudo 16APSK modulation can be obtained as 1100. Also, the symbol $$\frac{1}{\sqrt{38}}(1 + 1i)$$

can also be obtained using pseudo 16APSK modulation to map the first bits 1100.

FIG. 5B is a schematic diagram showing a bit-to-symbol mapping table of pseudo 16APSK modulation obtained according to the 256QAM bit-to-symbol mapping table in the 5G NR standards. In the example shown in FIG. 5B, the relationship between the first bits of pseudo 16APSK modulation and the second bits of 256QAM shown in the above formulas (3) and (4) can be determined, and the symbol mapping formula of pseudo 16APSK modulation can be obtained according to the 256 in the 5G NR standard QAM bit-to-symbol mapping table. As shown in FIG. 5B, the symbol $$\frac{1}{\sqrt{182}}(3 + 3i)$$

can be obtained using the bit-to-symbol mapping table of 256QAM to map the second bits 00001100. According to the relationship between the first bits of pseudo 16APSK modulation and the second bits of 256QAM shown in the above formulas (3) and (4), the first bits of pseudo 16APSK modulation corresponding to the second bits 00001100 can be obtained as 1100. That is, the symbol $$\frac{1}{\sqrt{182}}(3 + 3i)$$

can be also be obtained using pseudo 16APSK modulation to map the first bits 1100. It is to be understood that as shown in formula (7), the power normalization factor for 256QAM is $$\frac{1}{\sqrt{170}},$$

and as shown in formula (8), the power normalization factor for pseudo 16APSK is $$\frac{1}{\sqrt{182}}.$$

Since the table shown in FIG. 5B is the bit-to-symbol mapping table of the pseudo 16APSK modulation based on the bit-to-symbol mapping table of 256QAM, $$\frac{1}{\sqrt{182}}$$

is used as the factor for the symbol in the table shown in FIG. 5B. When performing the bit-to-symbol mapping according to 256QAM, the corresponding symbol with a factor $$\frac{1}{\sqrt{182}}$$

can also be obtained based on the second bits, but this symbol is not power normalized for 256QAM.

Alternatively, in the example shown in FIG. 5B, the symbol mapping formula of the pseudo 16APSK modulation can be obtained merely according to the relationship between the first bits of the pseudo 16APSK modulation and part of the second bits of 64QAM as shown in the above formula (3) and according to the bit-to-symbol mapping table of 256QAM in the 5G NR standards. As shown in FIG. 5B, the symbol $$\frac{1}{\sqrt{182}}(3+3i)$$

can be obtained using the bit-to-symbol mapping table of 256QAM to map the second bits 00001100. Based only on the relationship between the first bits of pseudo 16APSK modulation and the first 4 bits of the second bits of 256QAM as shown in the above formula (3), the first bits of pseudo 16APSK modulation corresponding to the second bits 00001100 can be obtained as 1100. That is, based only on the first 4 bits "0000" of the second bits 00001100, the corresponding first bits of pseudo 16APSK modulation can be obtained as 1100. Also, the symbol $$\frac{1}{\sqrt{182}}(3+3i)$$

can be obtained using pseudo 16APSK modulation to map the first bits 1100.

FIG. 5C is a schematic diagram showing a bit-to-symbol mapping table of pseudo 32 APSK modulation obtained according to the 256QAM bit-to-symbol mapping table in the 5G NR standards. In the example shown in FIG. 5C, the symbol mapping table of pseudo 32APSK modulation can be obtained based on the relationship between the first bits of pseudo 32APSK modulation and the second bits of 256QAM.

Alternatively, according to another embodiment of the present disclosure, for the same symbols obtained according to the pseudo N-order first-type modulation and according to the M-order second-type modulation, the p first bits may be the same as the first p second bits of the q second bits are the same. Further, the bit-to-symbol mapping table of the pseudo N-order first-type modulation can be obtained according to the bit-to-symbol mapping table of the M-order second-type modulation.

FIGS. 6A and 6B schematically illustrate that a bit-to-symbol mapping table of pseudo APSK modulation is obtained according to a bit-to-symbol mapping table of QAM in the 3GPP standards according to another example of the present disclosure. Specifically, FIG. 6A is a schematic diagram showing a bit-to-symbol mapping table of pseudo 16APSK modulation obtained according to the bit-to-symbol mapping table of 64QAM in the 5G NR standards. As shown in FIG. 6A, for the same symbol, the 4 first bits used by pseudo 16APSK modulation are the same as the first 4 bits of the 6 second bits used by 64QAM. For example, for symbol $$\frac{1}{\sqrt{38}}(1+1i),$$

the first bits used in pseudo 16APSK modulation is 0000, which are the same as the first 4 bits of the second bits 000011 used by 64QAM.

FIG. 6B is a schematic diagram showing a bit-to-symbol mapping table of pseudo 16APSK modulation obtained according to the bit-to-symbol mapping table of 256QAM in the 3GPP standards. As shown in FIG. 6B, for the same symbol, the 4 first bits used by pseudo 16APSK modulation are the same as the first 4 bits of the 8 second bits used by 256QAM. For example, for symbol $$\frac{1}{\sqrt{182}}(3+3i),$$

the first bits used by pseudo 16APSK modulation is 0000, which are the same as the first 4 bits of the second bits 00001100 used by 256QAM.

The above illustrates an example of obtaining the bit-to-symbol mapping table of pseudo APSK modulation according to the bit-to-symbol mapping table of QAM in the present disclosure in conjunction with FIGS. 5A to 5C and FIGS. 6A and 6B. It is to be understood that according to embodiments of the present disclosure, similar methods can also be used to obtain other N-order first-type modulations that need to be simulated. For example, pseudo 32 APSK modulation modulates in units of 5 first bits. The bit-to-symbol mapping table of pseudo 32 APSK modulation can be obtained based on the relationship between the first 5 bits of 256QAM and the first bits of pseudo 32 APSK modulation, and the bit-to-symbol mapping table of 256QAM in the 3GPP standards. For example, pseudo 64 APSK modulation modulates in units of 6 first bits. The bit-to-symbol mapping table of pseudo 64 APSK modulation can be obtained based on the relationship between the first 6 bits of 256QAM and the first bits of pseudo 64 APSK modulation, and the bit-to-symbol mapping table of 256QAM in the 3GPP standards.

According to another embodiment of the present disclosure, the electronic device 300 may further include a receiving unit to receive Modulation and Coding Strategy (MCS) signaling. The control unit 320 may perform pseudo N-order first-type modulation on the first input bit sequence according to the received modulation and coding strategy signaling and the predetermined modulation and coding strategy table, where the first-type modulation is APSK modulation. At least parameters related to pseudo N-order APSK modulation are included in the predetermined modulation and coding strategy table according to the embodiments of the present disclosure.

According to an example of the present disclosure, a modulation and coding strategy for pseudo APSK modulation may be added to the current modulation and coding strategy table. For example, the modulation and coding strategies for some modulations in the current modulation and coding strategy table can be deleted, and the modulation and coding strategies for pseudo APSK modulation can be added.

Therefore, the number of bits used for MCS signaling does not need to be increased. For example, the modulation and coding strategy of pseudo 16APSK can be used to replace the modulation and coding strategy related to 16QAM in the current modulation and coding strategy table. In addition, the pseudo 64APSK modulation and coding strategy can be used to replace the 64QAM-related modulation and coding strategy in the current modulation and coding strategy table.

For another example, the modulation and coding strategy of pseudo APSK modulation can be added to the current modulation and coding strategy table without deleting the modulation and coding strategy in the current modulation and coding strategy table. In this case, the number of bits for MCS signaling needs to be increased. For example, based on the current modulation and coding strategy table, modulation and coding strategies for pseudo 16APSK, pseudo 32APSK, pseudo 64APSK, and other modulation modes can be added.

FIGS. 7A and 7B are diagrams illustrating modulation and coding strategies according to embodiments of the present disclosure. In the example shown in FIG. 7A, as shown in the gray part, the modulation and coding strategy in the current modulation and coding strategy table where the value of the MCS indication $I_{MCS}$ is 10-22 are deleted, and the MCS indication 10-22 is used to indicate the modulation and coding strategies for 16APSK 256QAM modulation. In the example shown in FIG. 7A, since some modulation modes in the current modulation and coding strategy table are deleted, the same number of bits as the current number of bits required for the MCS indication can be used to notify the MCS indication $I_{MCS}$.

Alternatively, in the example shown in FIG. 7B, on the basis of the current modulation and coding strategy table, a modulation and coding strategy for 16APSK_256QAM modulation is added as shown in the gray part. Therefore, in the example shown in FIG. 7B, the MCS indication $I_{MCS}$ needs to be signaled using more bits than currently required for the MCS indication.

According to an example of the present disclosure, a table regarding some modulation and coding strategies supported by the communication system in which the electronic device is located may be predetermined. For example, a new MCS table containing only low PAPR constellation modulations may be predetermined. MCS signaling for a new MCS table containing only low PAPR constellation modulation can thus be sent with fewer bits. For example, local MCS tables can be set for low PAPR constellation modulation methods such as BPSK, $\pi$/2-BPSK, $\pi$/4-BPSK, QPSK, $\pi$/4-QPSK, pseudo 16APSK, pseudo 32APSK, pseudo 64APSK, etc., to facilitate the flexible selection of different MCS tables and adjust the overhead of the MCS indication.

In the case where a local MCS table is set, according to an example of the present disclosure, which MCS table is used may be determined through MCS identification information. In the case of downlink transmission, for example, the base station can choose whether to use a low peak-to-average ratio MCS table based on information (for example, about equivalent channels) fed back by the user equipment. If the base station determines that the equivalent channel gain is high, it can choose to use the traditional MCS table. Otherwise, it can choose the MCS table based on the N-APSK_M-QAM constellation and send the corresponding MCS identification information to the user equipment. For another example, the electronic device 300 may actively send MCS identification information to the base station to notify the base station that it requires an MCS solution with a low peak-to-average ratio. Similarly, in the case of uplink transmission, the base station can also notify the user equipment through the MCS identification information which MCS table to use, or the user equipment itself can select a specific MCS table and notify the base station through the MCS identification information. According to an example of the present disclosure, the MCS identification information may be sent using downlink control information (DCI), MAC layer control element (MAC CE), radio resource control (RRC) signaling or the like. According to another example of the present disclosure, in case the electronic device 300 can actively send MCS identification information to the base station, the MCS identification information can be sent using uplink control information (UCI) or the like.

Figure 8:
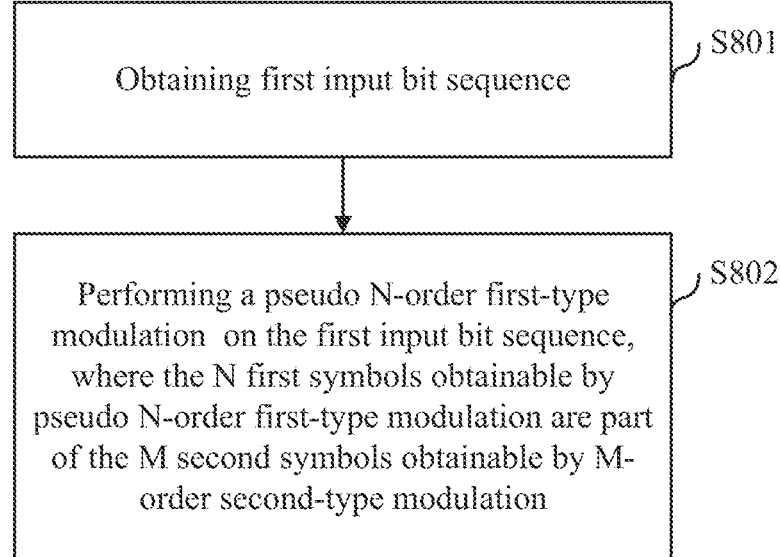
FIG. 8 is a flowchart of a modulation method according to one embodiment of the present disclosure.

A modulation method according to an embodiment of the present disclosure is described with reference to FIG. 8. FIG. 8 is a flowchart of a modulation method 800 according to one embodiment of the present disclosure. Since the steps of the modulation method 800 correspond to the operations of the electronic device 300 described above with reference to the figures, a detailed description of the same content is omitted here for simplicity.

As shown in FIG. 8, in step S801, a first input bit sequence is obtained. Then, in step S802, a pseudo N-order first-type modulation is performed on the first input bit sequence. For example, according to step S801, the base station can first obtain the first input bit sequence, and then perform pseudo N-order first-type modulation on the first input bit sequence to obtain the first symbol to be sent to the UE connected to the base station. In an embodiment of the present disclosure, the N first symbols obtainable by pseudo N-order first-type modulation are part of the M second symbols obtainable by M-order second-type modulation, where M and N are positive integers, and M is greater than N.

In an embodiment according to the present disclosure, the symbols obtainable using the N-order first-type modulation may be simulated by part of the M second symbols obtainable using the M-order second-type modulation. In embodiments according to the present disclosure, this N-order first-type modulation performed in a simulation manner may be called pseudo N-order first-type modulation, or N-order first-type modulation based on M-order second-type modulation.

For example, the second-type modulation may be traditional QAM, and the first-type modulation may be APSK modulation, circular QAM, spiral QAM, or the like. In embodiments of the present disclosure, symbols obtainable using modulation methods such as N-order APSK modulation, circular QAM, or spiral QAM can be simulated by using part of the M second symbols obtainable using M-order QAM. In some examples, simulating symbols obtainable using N-order first-type modulation from a portion of M second symbols obtainable using M-order second-type modulation may be performed with reference to FIG. 4.

According to an embodiment of the present disclosure, the control unit 320 may perform pseudo N-order first-type modulation on the first input bit sequence according to a bit-to-symbol mapping formula or a bit-to-symbol mapping table. Furthermore, according to another embodiment of the present disclosure, for the same symbol obtained according to the pseudo N-order first-type modulation and according to the M-order second-type modulation, the p first bits are a function of at least part of the q second bits. Therefore, the corresponding symbol mapping formula or bit-to-symbol mapping table of the pseudo first-type modulation can be obtained according to the symbol mapping formula or bit-to-symbol mapping table of the second-type modulation. The corresponding bit-to-symbol mapping formula of the pseudo first-type modulation may be obtained by referring to the formula (1) to the formula (8) to perform the symbol mapping formula or the bit-to-symbol mapping table of the second-type modulation. In addition, the corresponding bit-to-symbol mapping table of the pseudo first-type modulation may be obtained by performing a symbol mapping formula or a bit-to-symbol mapping table of the second-type modulation with reference to FIGS. 5A-5C.

Alternatively, according to another embodiment of the present disclosure, for the same symbol obtained according to the pseudo N-order first-type modulation and according to the M-order second-type modulation, the p first bits may be the same as the first p second bits of the q second bits. Further, the bit-to-symbol mapping table of the pseudo N-order first-type modulation can be obtained according to the bit-to-symbol mapping table of the M-order second-type modulation. The corresponding bit-to-symbol mapping table of the pseudo first-type modulation may be obtained by performing a symbol mapping formula or a bit-to-symbol mapping table according to the second-type modulation with reference to FIG. 6A and FIG. 6B.

According to another embodiment of the present disclosure, method 800 may further include receiving modulation and coding strategy (MCS) signaling. In step S802, the pseudo N-order first-type modulation can be performed on the first input bit sequence according to the received modulation and coding strategy signaling and the predetermined modulation and coding strategy table, where the first-type modulation is APSK modulation. In the predetermined modulation and coding strategy table according to the embodiment of the present disclosure, at least parameters related to pseudo N-order APSK modulation are included.

According to an example of the present disclosure, a modulation and coding strategy regarding pseudo APSK modulation may be added to the current modulation and coding strategy table. For example, the modulation and coding strategies for some modulations in the current modulation and coding strategy table can be deleted, and the modulation and coding strategies for pseudo APSK modulation can be added. Therefore, the number of bits used for MCS signaling does not need to be increased. For example, the modulation and coding strategy of pseudo 16APSK can be used to replace the modulation and coding strategy related to 16QAM in the current modulation and coding strategy table. In addition, the modulation and coding strategy of pseudo 64APSK can also be used to replace the 64QAM-related modulation and coding strategy in the current modulation and coding strategy table.

For another example, the modulation and coding strategy for pseudo APSK modulation can be added to the current modulation and coding strategy table without deleting the modulation and coding strategies in the current modulation and coding strategy table. In this case, the number of bits used for MCS signaling needs to be increased. For example, based on the current modulation and coding strategy table, modulation and coding strategies for pseudo 16APSK, pseudo 32APSK, pseudo 64APSK and other modulation modes can be added.

According to an example of the present disclosure, a table regarding some modulation and coding strategies supported by the communication system in which the electronic device is located may be predetermined. For example, a new MCS table containing only low PAPR constellation modulations may be predetermined. MCS signaling for a new MCS table containing only low PAPR constellation modulation can thus be sent with fewer bits. For example, local MCS tables can be set for low PAPR constellation modulation methods such as BPSK, $\pi/2$-BPSK, $\pi/4$-BPSK, QPSK, $\pi/4$-QPSK, pseudo 16APSK, pseudo 32APSK, pseudo 64APSK, etc., so as to facilitate the flexible selection of different MCS table, adjust the overhead of the MCS indication.

In the case where a local MCS table is set, according to an example of the present disclosure, which MCS table is used may be determined through MCS identification information. For example, the MCS identification information may be sent using downlink control information (DCI), MAC layer control element (MAC CE) or radio resource control (RRC) signaling. According to another example of the present disclosure, in the case where the electronic device 300 can actively send MCS identification information to the base station, the MCS identification information can be sent using uplink control information (UCI) or the like.

In the modulation method described above in conjunction with FIG. 8, by using a part of the M second symbols obtainable using the M-order second-type modulation to simulate the symbols obtainable using the N-order first-type modulation, constellation modulations that meet different needs can be obtained while ensuring compatibility.

<Hardware Structure>

In addition, the block diagrams used in the description of the above embodiments show blocks in units of functions. These functional blocks (structural units) are implemented by any combination of hardware and/or software. In addition, the means for realizing each functional block is not particularly limited. That is, each functional block may be implemented by one device that is physically and/or logically combined, or two or more devices that are physically and/or logically separated may have a direct and/or indirect (For example, wired and/or wireless) connection to achieve through the above-mentioned multiple devices.

Figure 9:
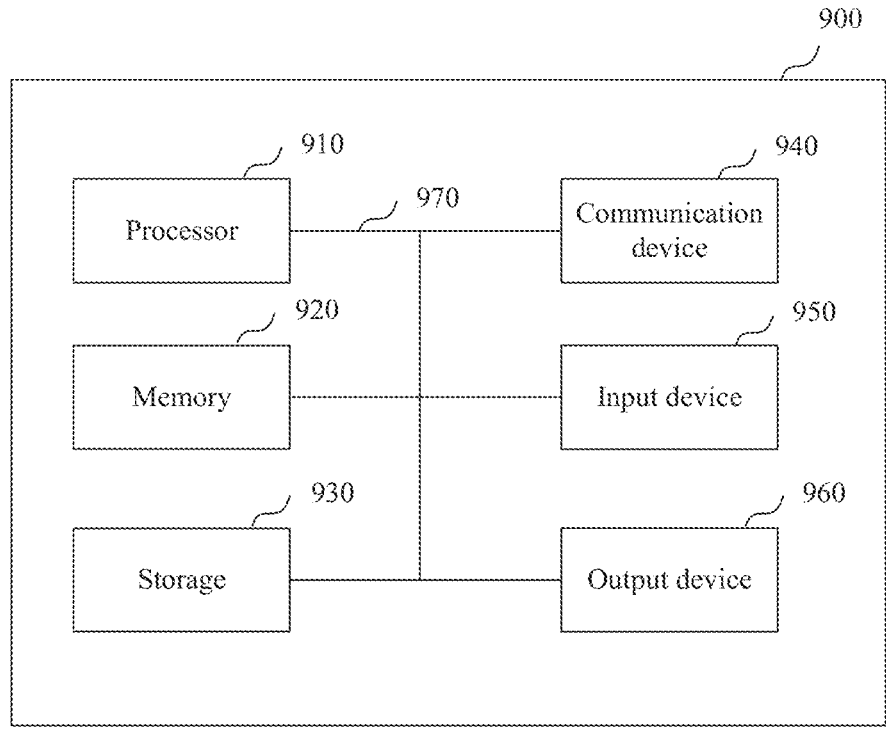
FIG. 9 is a schematic diagram of the hardware structure of the involved device according to embodiments of the present disclosure.

For example, an electronic device according to an embodiment of the present disclosure may function as a computer that executes the processing of the information transmission method of the present disclosure. FIG. 9 is a schematic diagram of the hardware structure of the involved device 900 (electronic device) according to an embodiment of the present disclosure. The above-mentioned device 900 (first network element) may be configured as a computer device physically including a processor 910, a memory 920, a storage 930, a communication device 940, an input device 950, an output device 960, a bus 970, and the like.

In addition, in the following description, the wording "device" may be replaced with circuit, device, unit, etc. The hardware structure of the electronic device may include one or more of the devices shown in the figures, or may not include some of the devices.

For example, only one processor 910 is shown in the figure, but it may also be multiple processors. In addition, the processing may be performed by one processor, or may be performed by more than one processor simultaneously, sequentially, or using other methods. Additionally, processor 910 may be implemented on more than one chip.

Each function of the device 900 is implemented, for example, by reading predetermined software (program) into hardware such as the processor 910 and the memory 920, causing the processor 910 to perform calculations, controlling communication by the communication device 940, and controlling the reading and/or writing of data in the memory 920 and the storage 930.

The processor 910 controls the entire computer by manufacturing an operating system, for example. The processor 910 may be composed of a central processing unit (CPU) including an interface with peripheral devices, a control device, an arithmetic device, a register, and the like. For example, the above-mentioned control unit and the like can be implemented by the processor 910.

In addition, the processor 910 reads out programs (program codes), software modules, data, etc. from the memory 930 and/or the communication device 940 to the memory 920, and performs various processes based on them. A program that causes a computer to perform at least part of the operations described in the above embodiments can be used as the program. For example, the processing unit of the first network element can be implemented by a control program stored in the memory 920 and operated by the processor 910. Other functional blocks can also be implemented in the same way.

The memory 920 is a computer-readable recording medium, which can be composed of at least one of, for example, read-only memory (ROM, Read Only Memory), programmable read-only memory (EPROM, Erasable Programmable ROM), electrically programmable read-only memory (EEPROM, Electrically EPROM), random access memory (RAM, Random Access Memory) and other appropriate storage media. The memory 920 may also be called a register, a cache, a main memory (main storage device), etc. The memory 920 can store executable programs (program codes), software modules, etc. for implementing the method according to an embodiment of the present disclosure.

The memory 930 is a computer-readable recording medium, which may be composed of at least one of, for example, a flexible disk, a floppy disk, a magneto-optical disk (for example, a CD-ROM (Compact Disc ROM), etc.), a digital versatile disc, Blu-ray (registered trademark) disc), removable disk, hard drive, smart card, flash memory device (e.g., card, stick, key driver), magnetic stripe, database, a server, and other appropriate storage media. Memory 930 may also be referred to as a secondary storage device.

The communication device 940 is a hardware for communicating between computers through a wired and/or wireless network, and is also called, for example, a network device, a network controller, a network card, a communication module, etc. The communication device 940 implements, for example, Frequency Division Duplex (FDD) and/or Time Division Duplex (TDD), which can include high-frequency switches, duplexers, filters, frequency synthesizers, etc. For example, the above-mentioned sending unit, receiving unit, etc. can be implemented by the communication device 940.

The input device 950 is an input device (e.g., keyboard, mouse, microphone, switch, button, sensor, etc.) that accepts input from the outside. The output device 960 is an output device (for example, a display, a speaker, a light emitting diode (LED, Light Emitting Diode) lamp, etc.) that performs output to the outside. In addition, the input device 950 and the output device 960 may also have an integrated structure (such as a touch panel).

In addition, each device such as the processor 910 and the memory 920 is connected through a bus 970 for communicating information. The bus 970 may be composed of a single bus or different buses between devices.

In addition, the electronic device may include microprocessors, digital signal processors (DSP), application-specific integrated circuits (ASICs), programmable logic devices (PLDs), and Field Programmable Gate Arrays (FPGA) and other hardware to realize part or all of each functional block. For example, processor 910 may be installed with at least one of these pieces of hardware.

(Modification)

In addition, terms described in this specification and/or terms required for understanding this specification may be interchanged with terms having the same or similar meaning. For example, channels and/or symbols can also be signals (signaling). In addition, signals can also be messages. The reference signal can also be called RS (Reference Signal) for short, and can also be called pilot, pilot signal, etc according to the applicable standard. In addition, a component carrier (CC) can also be called a cell, frequency carrier, carrier frequency, etc.

In addition, the information, parameters, etc. described in this specification may be expressed as absolute values, relative values to prescribed values, or other corresponding information. For example, a radio resource may be indicated by a specified index. Furthermore, the formulas and the like using these parameters may also be different from those explicitly disclosed in this specification.

The names used for parameters and the like in this specification are not limiting in any way. For example, various channels (Physical Uplink Control Channel (PUCCH), Physical Downlink Control Channel (PDCCH, etc.) and information units may be identified by any appropriate name, and the various names assigned to these various channels and information units are not limiting in any respect.

The information, signals, etc. described in this specification may be represented using any of a variety of different technologies. For example, the data, commands, instructions, information, signals, bits, symbols, chips, etc. that may be mentioned in all the above descriptions may be transmitted through voltages, currents, electromagnetic waves, magnetic fields or magnetic particles, light fields or photons, or any combination thereof.

In addition, information, signals, etc. may be output from an upper layer to a lower layer and/or from a lower layer to an upper layer. Information, signals, etc. can be input or output via multiple network nodes.

Input or output information, signals, etc. can be saved in a specific place (such as memory) or managed through a management table. Input or output information, signals, etc. can be overwritten, updated, or supplemented. Output information, signals, etc. can be deleted. Input information, signals, etc. can be sent to other devices.

Notification of information is not limited to the methods/implementations described in this specification, and can also be performed through other methods. For example, notification of information can be through physical layer signaling (e.g., downlink control information (DCI), uplink control information (UCI)), upper layer signaling (for example, Radio Resource Control (RRC) signaling, broadcast information (master information block (MIB), System Information Block (SIB), etc.), media access control (MAC) signaling, other signals or the combination thereof.

In addition, physical layer signaling may also be called L1/L2 (Layer 1/Layer 2) control information (L1/L2 control signal), L1 control information (L1 control signal), etc. In addition, RRC signaling may also be called an RRC message, for example, it may be an RRC Connection Setup message, an RRC Connection Reconfiguration message, etc. In addition, MAC signaling may be notified through a MAC control element (MAC CE), for example.

In addition, the notification of specified information (for example, the notification of "being X" is not limited to explicit notification, and can also be implicit (for example, by not notifying the specified information or by notifying other information).

Judgment can be made using a value represented by 1 bit (0 or 1), a true or false value (Boolean value) represented by true (true) or false (false), or a comparison of numerical values (For example, a comparison with a specified value).

Software, whether called software, firmware, middleware, microcode, hardware description language, or by any other name, shall be construed broadly to mean commands, command sets, code, code segments, program code, programs, sub-programs, software module, application, software application, software package, routine, subroutine, object, executable file, thread of execution, step, function, etc.

Additionally, software, commands, information, etc. may be sent or received via transmission media. For example, when using wired technology (coaxial cable, optical cable, twisted pair, digital subscriber line (DSL), etc.) and/or wireless technology (infrared, microwave, etc.) to send software from a website, server, or other remote resource, these wired and/or wireless technologies are included in the definition of transmission media.

The terms "system" and "network" used in this specification are used interchangeably.

In this specification, such terms as "base station (BS)", "wireless base station", "eNB", "gNB", "cell", "sector", "cell group", "carrier" and "component carrier" can be used interchangeably. A base station is sometimes also referred to as a fixed station, NodeB, eNodeB (eNB), access point, sending point, receiving point, femtocell, small cell, and other terms.

A base station can accommodate one or more (e.g. three) cells (also called sectors). When a base station accommodates multiple cells, the entire coverage area of the base station can be divided into multiple smaller areas, and each smaller area can also be accessed through a base station subsystem (e.g., indoor small base station (Remote Radio Head (RRH), Remote Radio Head))) to provide communication services. The terms "cell" or "sector" refer to a portion or the entire coverage area of a base station and/or base station subsystem that provides communication services within that coverage.

In this specification, the terms "Mobile Station (MS)", "User Terminal (User Terminal)", "User Equipment (UE)" and "Terminal" are used interchangeably. A mobile station is sometimes referred to by those skilled in the art as a subscriber station, mobile unit, subscriber unit, wireless unit, remote unit, mobile device, wireless device, wireless communications device, remote device, mobile subscriber station, access terminal, mobile terminal, wireless Terminal, remote terminal, handset, user agent, mobile client, client or any other suitable term.

In addition, the wireless base station in this specification can also be replaced by a user terminal. For example, various modes/implementations of the present disclosure may also be applied to a structure in which communication between a wireless base station and a user terminal is replaced by communication between multiple user terminals (D2D, Device-to-Device). At this time, the functions of the above-mentioned electronic device can be regarded as the functions of the user terminal. In addition, words such as "upline" and "downline" can also be replaced with "side". For example, the uplink channel can also be replaced by a side channel.

Similarly, the user terminal in this specification can also be replaced by a wireless base station. At this time, the above-mentioned functions of the user terminal can be regarded as functions of the first communication device or the second communication device.

In this specification, it is assumed that a specific operation performed by a base station may also be performed by its upper node (upper node) depending on the situation. Obviously, in a network with a base station consisting of one or more network nodes, various actions performed for communication with terminals can be performed through the base station, or one or more network nodes other than the base station (for example, a mobility management entity (MME), service gateway (S-GW, Serving-Gateway), etc., but not limited to this can be considered), or their combination. Each of the methods/implementations described in this specification can be used individually or in combination or can be used by switching during execution. In addition, the order of the processing steps, sequences, flowcharts, etc. of each mode/implementation described in this specification may be changed as long as there is no contradiction. For example, regarding the method described in this specification, various step units are given in an exemplary order and are not limited to the specific order given.

Embodiments/implementations described in this specification can be applied to utilize Long Term Evolution (LTE), Long Term Evolution Advanced (LTE-A, LTE-Advanced), Long Term Evolution Beyond (LTE-B, LTE-Beyond), Super 3rd generation mobile communication system (SUPER 3G), advanced international mobile communication (IMT-Advanced), 4th generation mobile communication system (4G, 4th generation mobile communication system), 5th generation mobile communication system (5G, 5th generation mobile communication system), future wireless access (FRA, Future Radio Access), new wireless access technology (New-RAT, Radio Access Technology), new wireless (NR, New Radio), new wireless access (NX, New radio access), new generation wireless access (FX, Future generation radio access), Global System for Mobile communications (GSM (registered trademark), Global System for Mobile communications), code division multiple access 3000 (CDMA3000), Ultra Mobile Broadband (UMB), IEEE 920.11 (Wi-Fi (registered trademark)), IEEE 920.16 (WiMAX (registered trademark)), IEEE 920.20, ultra-wideband (UWB, Ultra-WideBand), Bluetooth (Bluetooth (registered trademark)), systems with other appropriate wireless communication methods and/or next-generation systems expanded based on them.

The expression "based on" used in this specification does not mean "only based on" unless it is explicitly stated in other paragraphs. In other words, the description "based on" means both "based on" and "based on at least".

Any reference used in this specification to units using names such as "first", "second", etc. is not intended to comprehensively limit the number or order of these units. These names may be used in this specification as a convenient way of distinguishing two or more units. Thus, reference to a first unit and a second unit does not mean that only two units may be employed or that the first unit must precede the second unit in some form.

The term "determining" used in this specification may include a variety of actions. For example, regarding "judgment (determination)", calculating, computing, processing, deriving, investigating, looking up (such as looking up in tables, databases, or other data structures), ascertaining, etc. are regarded as "determination". In addition, regarding "judgment (determination)", receiving (such as receiving information), transmitting (such as transmitting information), inputting, outputting, and accessing (such as accessing data in memory), etc. are regarded as "judgment (determination)". In addition, regarding "judgment (determination)", resolving, selecting, choosing, establishing, comparing, etc. can also be regarded as "judgment (determination)". In other words, regarding "judgment (determination)", several actions can be regarded as performing "judgment (determination)".

The terms "connected", "coupled" or any variations thereof used in this specification refer to any direct or indirect connection or combination between two or more units. Including the following situations: there is one or more intermediate units between two units that are "connected" or "combined" with each other. The combination or connection between units can be physical, logical, or a combination of both. For example, "connection" can also be replaced by "access". As used in this specification, two units may be considered to be connected through the use of one or more wires, cables, and/or printed electrical connections, and, by way of several non-limiting and non-exhaustive examples, through the use of radio frequency areas, microwave region, and/or electromagnetic energy with wavelengths in the light (both visible light and invisible light) region, are "connected" or "combined" with each other.

The terms "including", "comprising", and their variations are used in this specification or claims, these terms are as open-ended as the term "having". Furthermore, the wording "or" used in this specification or the claims does not mean exclusive-OR.

The present disclosure has been described in detail above. However, it is obvious to those skilled in the art that the present disclosure is not limited to the embodiments described in this specification. The present disclosure can be implemented with modifications and changes without departing from the spirit and scope of the present disclosure determined by the description of the claims. Therefore, the description in this specification is for the purpose of illustration and does not have any restrictive meaning on the present disclosure.

What is claimed is:

1. An electronic device, comprising:
   a receiver configured to obtain a first input bit sequence;
   a controller configured to perform pseudo N-order first-type modulation including power normalization processing on the first input bit sequence to obtain N first symbols, the pseudo N-order first-type modulation is N-order first-type modulation based on M-order second-type modulation, wherein the N first symbols obtainable by the pseudo N-order first-type modulation are part of M second symbols obtainable by M-order second-type modulation, wherein M and N are positive integers, and M is greater than N;
a transmitter configured to transmit the N first symbols to another electronic device;
wherein, according to the pseudo N-order first-type modulation, a bit-to-symbol mapping is performed in units of p first bits;
according to the M-order second-type modulation, a bit-to-symbol mapping is performed in units of q second bits;
for the same symbol obtained according to the pseudo N-order first-type modulation and according to the M-order second-type modulation, a part of the p first bits is a function of at least a part of the q second bits, wherein p and q are positive integers, and q is greater than p.

2. The electronic device of claim 1, wherein
the controller performs the pseudo N-order first-type modulation on the first input bit sequence according to a bit-to-symbol mapping formula or a bit-to-symbol mapping table.

3. The electronic device of claim 1, wherein
the bit-to-symbol mapping formula or the bit-to-symbol mapping table of the pseudo N-order first-type modulation corresponds to the bit-to-symbol mapping formula or the bit-to-symbol mapping table of the M-order second-type modulation.

4. The electronic device of claim 2, wherein
for the same symbol obtained according to the pseudo N-order first-type modulation and according to the M-order second-type modulation, the p first bits are the same as the first p second bits of the q second bits.

5. The electronic device of claim 4, wherein
the bit-to-symbol mapping table of the pseudo N-order first-type modulation corresponds to the bit-to-symbol mapping table of the M-order second-type modulation.

6. The electronic device of claim 1, further comprising:
the receiver configured to receive modulation and coding strategy signaling,
the controller to perform the pseudo N-order first-type modulation on the first input bit sequence according to the modulation and coding strategy signaling and a predetermined modulation and coding strategy table, wherein
the first-type modulation is APSK modulation,
the predetermined modulation and coding strategy table at least include parameters regarding pseudo N-order APSK modulation.

7. The electronic device of claim 6, wherein
the predetermined modulation and coding strategy table is a table regarding some or all of modulation and coding strategies supported by a communication system where the electronic device is located.

8. A modulation method comprising:
obtaining a first input bit sequence;
performing pseudo N-order first-type modulation including power normalization processing on the first input bit sequence to obtain N first symbols, the pseudo N-order first-type modulation is N-order first-type modulation based on M-order second-type modulation, wherein
the N first symbols obtainable by the pseudo N-order first-type modulation are part of second symbols obtainable by M-order second-type modulation, wherein M and N are positive integers, and M is greater than N;

transmitting the N first symbols to another electronic device;

wherein, according to the pseudo N-order first-type modulation, a bit-to-symbol mapping is performed in units of p first bits;

according to the M-order second-type modulation, a bit-to-symbol mapping is performed in units of q second bits;

for the same symbol obtained according to the pseudo N-order first-type modulation and according to the M-order second-type modulation, a part of the p first bits is a function of at least a part of the q second bits, wherein p and q are positive integers, and q is greater than p.

9. The method of claim 8, wherein the pseudo N-order first-type modulation is performed on the first input bit sequence according to a bit-to-symbol mapping formula or a bit-to-symbol mapping table.

\* \* \* \* \*